United States Patent [19]
Fujita et al.

[11] Patent Number: 5,122,787
[45] Date of Patent: Jun. 16, 1992

[54] FERROELECTRIC LIQUID CRYSTAL TOUCH PANEL

[75] Inventors: Masanori Fujita; Shinichi Okamoto; Hirokazu Ono, all of Tokyo, Japan

[73] Assignee: Seikosha Co., Ltd., Tokyo, Japan

[21] Appl. No.: 465,864

[22] Filed: Jan. 16, 1990

[30] Foreign Application Priority Data

Jan. 18, 1989 [JP] Japan ................................. 1-8864

[51] Int. Cl.$^5$ .............................................. G09G 3/02
[52] U.S. Cl. .................................. 340/712; 340/706; 341/34; 310/338
[58] Field of Search .............. 340/706, 718, 719, 712, 340/784; 350/350 S; 341/34; 310/311, 338; 73/862.04

[56] References Cited

U.S. PATENT DOCUMENTS

| | | | |
|---|---|---|---|
| 4,412,210 | 10/1983 | Washizuka et al. | 341/34 |
| 4,869,577 | 9/1989 | Masaki | 350/350 S |
| 4,875,378 | 10/1989 | Yamazaki et al. | 73/862.04 |

Primary Examiner—Alvin E. Oberley
Assistant Examiner—Matthew Luu
Attorney, Agent, or Firm—Jordan and Hamburg

[57] ABSTRACT

A ferroelectric liquid crystal touch panel includes a ferroelectric liquid crystal panel including counterposed electrodes and a ferroelectric liquid crystal positioned between the electrodes; a position detector for detecting a pushed position on the ferroelectric liquid crystal through the electrodes by means of an electromotive force generated when the ferroelectric liquid crystal is pushed; a display control circuit for controlling a display state of the ferroelectric liquid crystal through the electrodes; a sound generation control circuit for supplying a sound generation signal to the electrodes so that the ferroelectric liquid crystal panel generates a sound in correspondence thereto; and a selection circuit for selectively connecting the position detector, the display control circuit and the sound generation control circuit to the electrodes.

6 Claims, 3 Drawing Sheets

FERROELECTRIC LIQUID CRYSTAL TOUCH PANEL

BACKGROUND OF THE INVENTION

The present invention relates to a ferroelectric liquid crystal touch panel.

In recent years, accompanying the increase in the amount and complication of information treated in information devices, there is the related tendency that various devices are becoming too large and complicated. Therefore, in order to make the entire device compact, a device has been proposed which has both an input function and another function, such as a display function.

For example, a device provided with such plural functions is a panel using a liquid crystal as will more specifically be shown hereinafter.

A first such device includes a liquid crystal panel equipped with an input function and which determines the change of distance between electrodes of the panel in the case when the display surface of the liquid crystal panel is pushed as a change of the electrical capacity, and the pushed position of the liquid crystal panel is detected thereby.

The second such device includes a liquid crystal panel equipped with an input function and which effects heat writing with a light pen comprising a semiconductor laser and a focussing lens into the liquid crystal display device using a thermoelectric optical effect. The difference of the display state is determined as a change of the electric capacity, and the position thermally written on the liquid crystal panel is detected thereby.

In the above-described first liquid crystal panel, since the liquid crystal shows dielectric constant anisotopy, the electric capacity changes also by the display state of the liquid crystal (on, off, or intermediate state). It is therefore necessary to separate the change of electric capacity in the case when the display surface of the panel is pushed and there is a change of electric capacity due to the display state. Therefore, the construction of the detecting circuit becomes complicated, and together with that, there is the problem that separation of the above-described respective capacities becomes extremely difficult.

In the above-described second liquid crystal panel, since the change of the writing-in state is detected as a change of electric capacity, there is the problem that the input cannot be effected without changing the display state. Further, since a special device such as a light pen and the like is required, there is also the problem that the device becomes expensive.

As described above, it was impossible heretofore to obtain an effective liquid crystal panel equipped with both an input function and another function, such as a display function.

An object of the present invention is to obtain a liquid crystal panel equipped with a plural number of functions, including an input function.

The present invention utilizes the piezoelectric effect of a ferroelectric liquid crystal.

DETAILED DESCRIPTION OF THE PREFERRED EMBODIMENTS

In the following, embodiments of the present invention will be explained by referring to drawings.

The present invention relates to a device which carries out, for example, the key input and display by use of a single ferroelectric liquid crystal panel.

Figure 1:
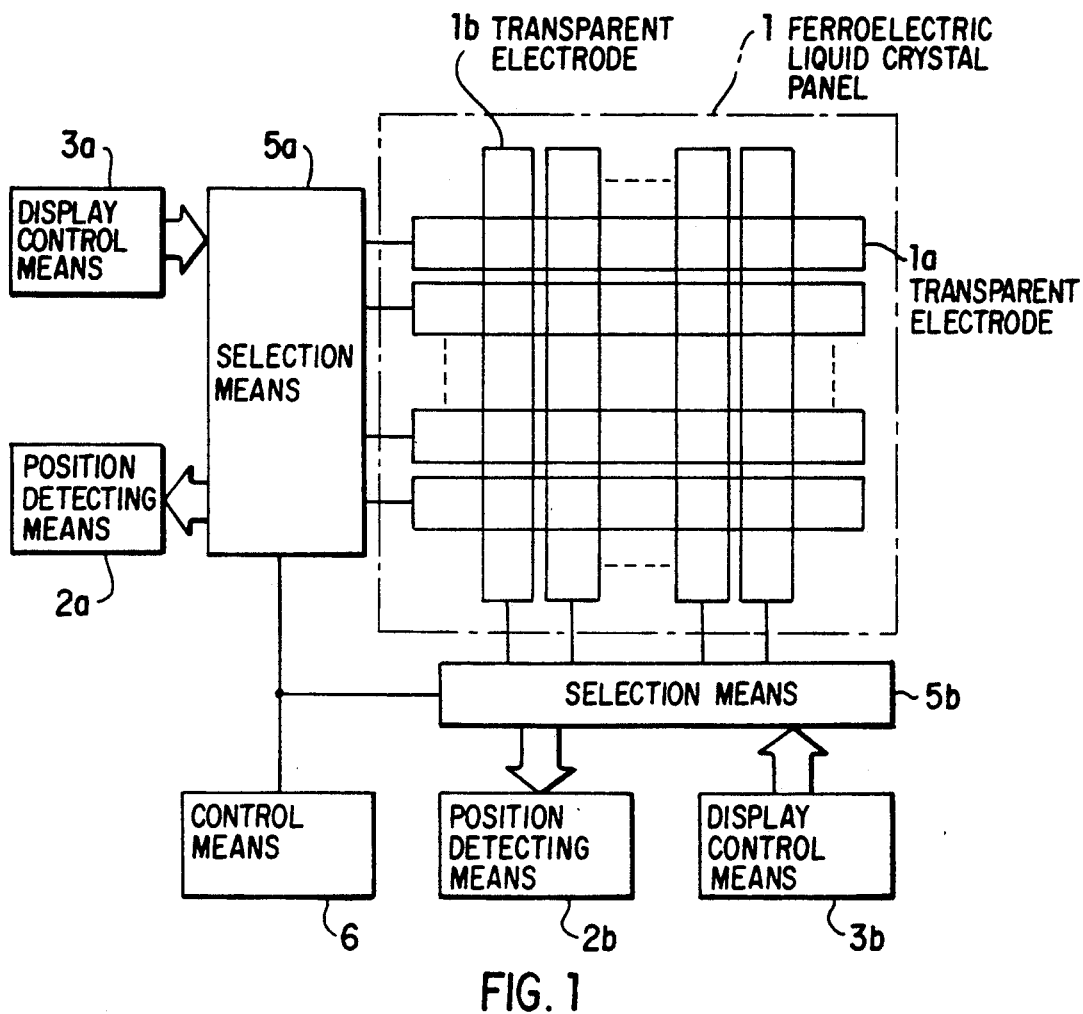
FIG. 1 is a block diagram showing an embodiment of the present invention.
Figure 2:
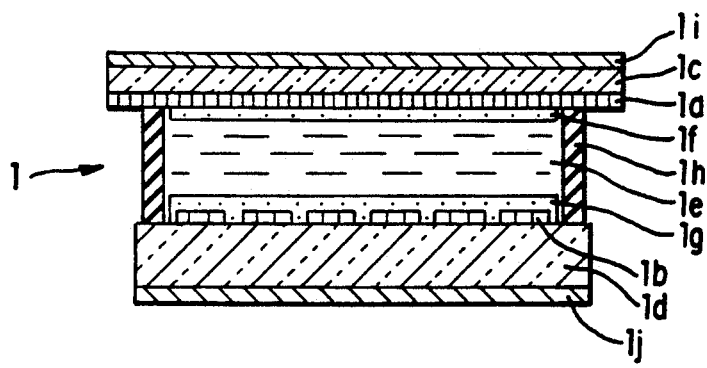
FIG. 2 is a sectional diagram of the ferroelectric liquid crystal panel in FIG. 1.

Referring to the drawings, a ferroelectric liquid crystal panel 1 has the construction shown in FIGS. 1 and 2. Specifically, on the counterposed surfaces of the counterposing substrates 1c and 1d, there are formed transparent electrodes 1a and 1b, and alignment layers 1f and 1g using polyimide or the like, and a ferroelectric liquid crystal 1e is sealed between the substrates 1c and 1d. For the above-described substrate 1c, it is preferable to use a flexible transparent body such as a plastic (PET film and the like) or the like, and for the above-described substrate 1d, it is preferable to use a transparent body such as glass or the like. The electrodes 1a and 1b constitute a matrix as shown in FIG. 1. The numeral 1h denotes a seal material using epoxy resin or the like, and numerals 1i and 1j denote polarizing plates.

The above-described ferroelectric liquid crystal panel 1 has the following characteristics:

(1) The alignment layers are subjected to a homogeneous alignment treatment.

(2) The alignment layers are shifted with respect to each other out of a parellel or antiparallel arrangement and have been subjected to a homogeneous alignment treatment.

(3) At least one alignment layer has been subjected to a homogeneous alignment treatment by a strong rubbing method.

(4) The ferroelectric liquid crystal is in a phase showing ferroelectricity.

(5) The distance between the counterposed electrodes is as narrow as possible.

(6) The alignment layer at one side is formed with a material attracting spontaneous polarization of the ferroelectric liquid crystal, and the alignment layer at the other side is formed with a material repulsing spontaneous polarization of the ferroelectric liquid crystal.

(7) For the ferroelectric liquid crystal, one having a large spontaneous polarization is used.

Referring back to FIG. 1, position detecting means 2a and 2b are provided for detecting the pushed position through electrodes 1a and 1b by the electromotive force generated between electrodes 1a and 1b when the side of substrate 1c in the above-described ferroelectric liquid crystal panel 1 is pushed. Position detecting means 2a and 2b are mainly constituted by operational amplifiers for voltage detecting use.

Display control means 3a and 3b are provided for controlling the display state of the above-described ferroelectric liquid crystal panel 1 through the electrodes 1a and 1b. Display control means 3a and 3b are mainly constituted by driving circuits for driving the liquid crystal.

Selection means 5a and 5b are provided for selecting the connection of the above-described position detecting means 2a and 2b and display control means 3a and 3b to the above-described electrodes 1a and 1b in a time-sharing manner. Specifically, the connection of position detecting means 2a and 2b and display control means 3a and 3b to the same electrodes 1a and 1b changes over in a time-sharing manner. Selection means 5a and 5b are constituted by array-like switching elements. When position detecting means 2a and 2b are connected to electrodes 1a and 1b by selection means 5a and 5b, the connection of display control means 3a and 3b to electrodes 1a and 1b is cut off. Conversely, when display control means 3a and 3b are connected to electrodes 1a and 1b by selection means 5a and 5b, the connection of position detecting means 2a and 2b to electrodes 1a and 1b is cut off.

Further, a control means 6 is provided for sending control signals to the above-described selection means 5a and 5b.

Next, an explanation will be given on the operation of the ferroelectric liquid crystal touch panel by use of the above-described elements.

From control means 6, for example, a control signal for changing over between logic level "1" and logic level "0" is sent to selection means 5a and 5b at each period of 1 msec.

When the control signal is at logic level "1", position detecting means 2a and 2b are connected to electrodes 1a and 1b by the above-described selection means 5a and 5b. When ferroelectric liquid crystal panel 1 is pushed, the pushed position is detected in this period. The cross point of the largest electromotive force is judged as the pushed position, from among the electromotive forces generated at the plural number of cross points of the electrodes constituting the matrix.

On the other hand, when the control signal is at logic level "0", display control means 3a and 3b and electrodes 1a and 1b are connected by the above-described selection means 5a and 5b. At this time, a predetermined electrode 1a is selected and a selection signal is applied by the display control means 3a, and a non-selective signal is applied on the other electrode. Further, the display signals are applied by display control means 3a and 3b to all electrodes 16 in synchronization to the selection signal. Next, when the control signals become logic level "0", an electrode 1a other than the above-described predetermined electrode 1a is selected. Specifically, for the display control, only one electrode 1a is selected each time that the control signal becomes logic level "0", and scanning is effected successively as is performed in a conventional liquid crystal display device.

In the above-described embodiment, although only one electrode 1a was selected each time that the control signal became logic level "0", several or all electrodes 1a may be successively selected during the period when the control signal is at logic level "0", and these electrodes may be scanned continuously.

Although ferroelectric liquid crystal panel 1 shown in FIG. 2 has been premised to have a double refraction display using two polarization plates, it is also possible to apply a guest host mode for effecting such display by mixing two dichroic dyes into the ferroelectric liquid crystal, and in this case, one polarization plate may be used.

Figure 3:
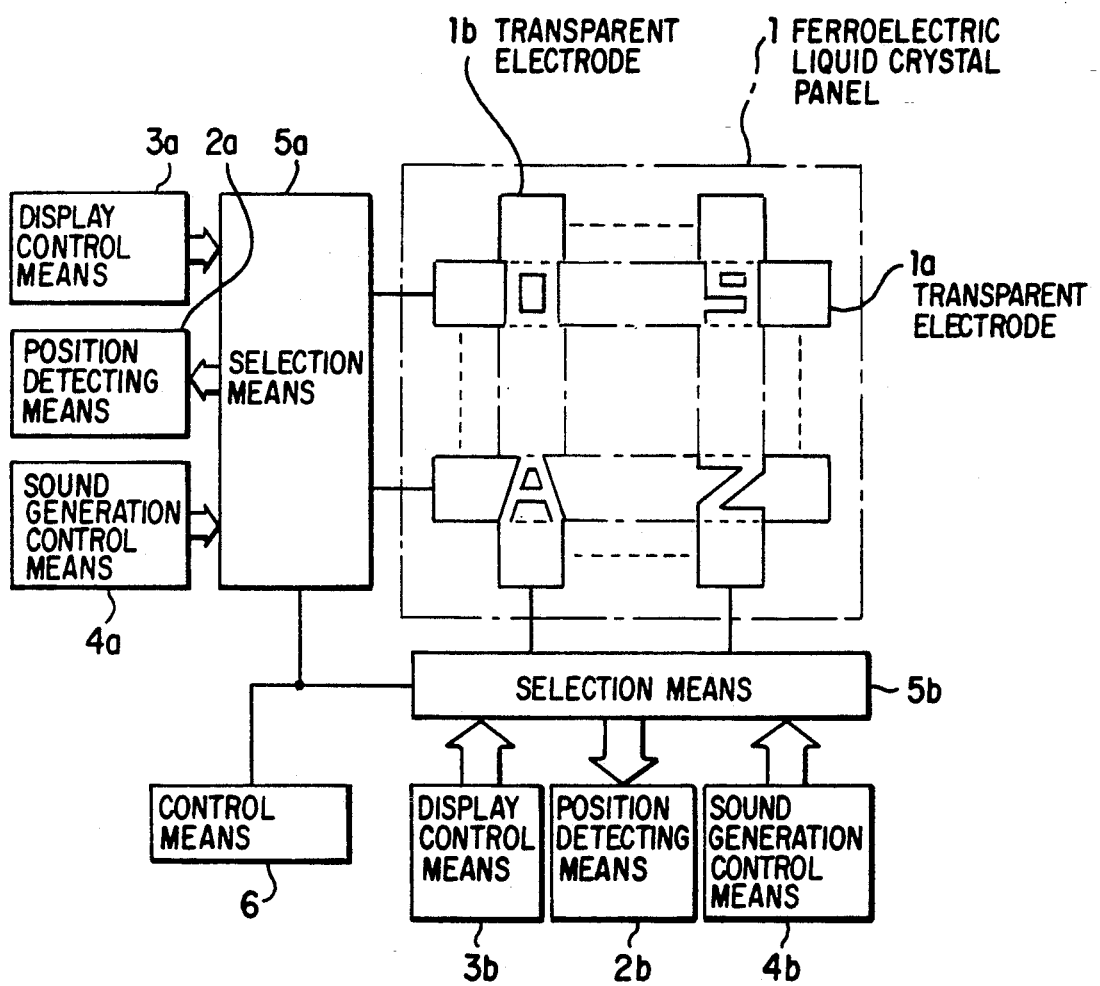
FIG. 3 is a block-explanatory diagram showing the key input device using the embodiment of FIG. 1.

Referring now to FIG. 3, a key input device is shown, as an example of a concrete use of the above-described embodiment.

As shown in FIG. 3, the display of various input keys such as characters, numbers, marks, etc., is carried out at the cross points of electrodes 1a and 1b. In order to carry out the display, in the same manner as in a conventional liquid crystal display panel, electrodes 1a and 1b may be pattern formed in a desired shape. The user may push desired keys while seeing the characters, numbers, marks, etc., displayed on the ferroelectric liquid crystal panel. Also, when the input key is pushed, it is more effective to supply sound-generating signals from sound generation control means 4a and 4b to the electrodes corresponding to the keys accepting the input to let them generate sound.

It is noted that at the plural number of cross points of electrodes 1a and 1b, display of the characters, numbers, marks, etc., may be carried out.

Next, an explanation will be given of other embodiments of the present invention.

In addition to position detecting means 2a and 2b and display control means 3a and 3b in the above-described embodiment, sound generation control means 4a and 4b are provided, and in the same manner as in the first-described embodiment, all of these are connected successively to the electrodes in a time-sharing manner. In other words, in FIG. 3, sound generation control means 4a and 4b are connected to selection means 5a and 5b, in addition to position detecting means 2a and 2b and display control means 3a and 3b. An explanation will now be given in which sound generation control means 4a and 4b are added to the system shown in FIG. 1.

Figure 4:
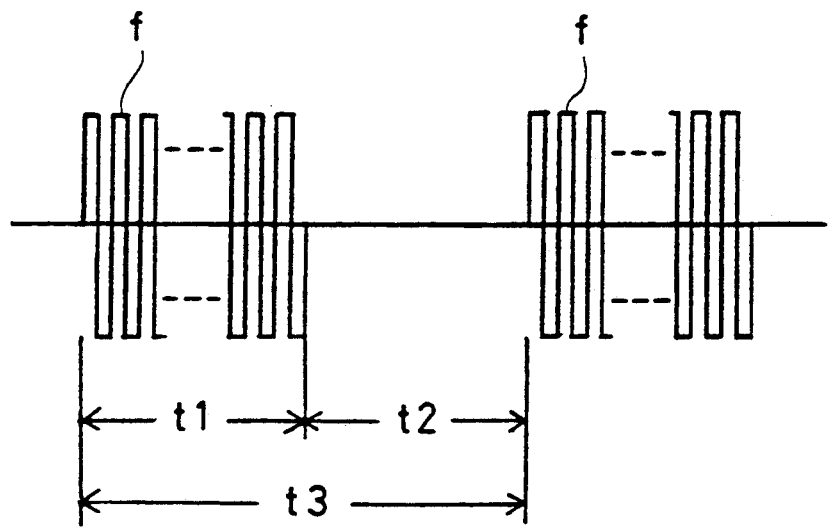
FIG. 4 is a timing diagram used for explaining the operation of the embodiment of FIG. 3 of the present invention.

FIG. 4 is a timing diagram for showing an example of the operation in the present instance.

In the same Figure, in the period t1, sound generation control means 4a and 4b and electrodes 1a and 1b are connected by selection means 5a and 5b. Then AC voltage of a frequency f (about 4096 Hz) is applied between electrodes 1a and 1b by sound generation control means 4a and 4b, and sound is generated from ferroelectric liquid crystal panel 1 by the piezoelectric effect of the ferroelectric liquid crystal.

In the period t2 (about 62.5 msec), position detecting means 2a and 2b and display control means 3a and 3b are selected by selection means 5a and 5b. The performance at this time is the same as that in the already-described first embodiment.

As described above, in the example of FIG. 4, modulation of 1/t3 Hz (about 8 Hz) is applied for the sound generation, and in the rest period t2 of the sound generation, position detection and display control are effected. The modulation is not limited to the example described above. For example, for the fundamental frequency of 4096 Hz, a modulation of 8 Hz and 256 Hz, etc., may be applied. In such as case, it is also preferable that the position detection is effected in the rest period of 256 Hz, and the display control is effected in the rest time of 8 Hz.

Figure 5:
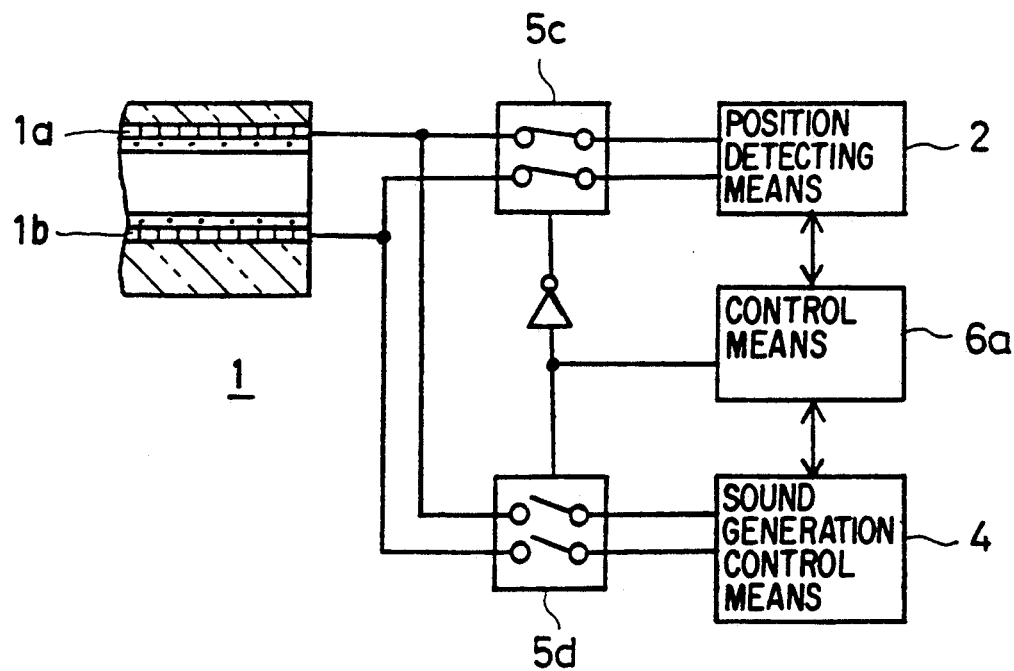
FIG. 5 is a block diagram of another embodiment of the present invention.

Next, another embodiment of the present invention will be explained by referring to FIG. 5.

In the stationary state, position detecting means 2 and electrodes 1a and 1b are connected by selection means 5c and 5d, and sound generation control means 4 and electrodes 1a and 1b are not connected. When ferroelectric liquid crystal panel 1 is pushed, and the pushed position is detected by position detecting means 2, the states of the above-described selection means 5c and 5d are reversed. In other words, position detecting means 2 and electrodes 1a and 1b are not connected, and sound generation control means 4 and electrodes 1a and 1b are connected. As a result, after generation of the sound, in that predetermined sound generation signals are sent from the sound generation control means to electrodes 1a and 1b, the device returns to the stationary state, that is, only when ferroelectric liquid crystal panel 1 is pushed, sound is generated. Numeral 6a denotes the control means.

In the above-described embodiment, the position detecting means, display control means, and sound generation control means were suitably selected with a selecting means, and the above-described respective means were connected to common electrodes.

However, in the present invention, it is not necessarily required that the above-described respective means use the same electrode, and the above-described respective means may be connected to electrodes different from each other.

According to the present invention, since the pushed position of the panel is detected from the electromotive force by use of the piezoelectric effect of the ferroelectric liquid crystal, the pushed position can be positively detected without relation to the fluctuation of the cell thickness and the display state.

Also, since a plural number of functions such as the position detection, display, and sound generation can be obtained, miniaturization and thin type formation of the whole device can be attained.

Also, by providing a selection means, since the position detection, display control and sound generation can be individually effected, respective functions can be positively performed.

Although the present invention has been described through specific terms, it should be noted here that the described embodiments are not necessarily exclusive and that various changes and modifications may be imparted thereto without departing from the scope of the invention, which is limited solely by the appended claims.

What we claim is:

1. A ferroelectric liquid crystal touch panel comprising:
    a ferroelectric liquid crystal panel including counterposed electrodes and a ferroelectric liquid crystal positioned between said electrodes;
    position detecting means coupled to said electrodes for detecting a pushed position on said ferroelectric liquid crystal by detecting an electromotive force generated when the ferroelectric liquid crystal is pushed; and
    sound generation control means coupled to supply a sound generation signal to said electrodes so that said ferroelectric liquid crystal panel generates a sound in correspondence thereto.

2. A ferroelectric liquid crystal touch panel comprising:
    a ferroelectric liquid crystal panel including counterposed electrodes and a ferroelectric liquid crystal positioned between said electrodes;
    position detecting means for detecting a pushed position on said ferroelectric liquid crystal by detecting an electromotive force generated when the ferroelectric liquid crystal is pushed;
    sound generation control means for supplying a sound generation signal to said electrodes so that said ferroelectric liquid crystal panel generates a sound in correspondence thereto; and
    selection means for selectively connecting said position detecting means and said sound generation control means to said electrodes.

3. A ferroelectric liquid crystal touch panel according to claim 2, wherein said selection means includes means for selectively connecting said position detecting means and said sound generation control means to said electrodes in a time sharing manner.

4. A ferroelectric liquid crystal touch panel comprising:
    a ferroelectric liquid crystal panel including counterposed electrodes and a ferroelectric liquid crystal positioned between said electrodes;
    position detecting means coupled to said electrodes for detecting a pushed position on said ferroelectric liquid crystal by detecting an electromotive force generated when the ferroelectric liquid crystal is pushed; and
    display control means coupled to said electrodes for controlling a display state of said ferroelectric liquid crystal through said electrodes; and
    sound generation control means for supplying a sound generation signal to said electrodes so that said ferroelectric liquid crystal panel generates a sound in correspondence thereto.

5. A ferroelectric liquid crystal touch panel comprising:
    a ferroelectric liquid crystal panel including counterposed electrodes and a ferroelectric liquid crystal positioned between said electrodes;
    positioned detecting means for detecting a pushed position on said ferroelectric liquid crystal by detecting an electromotive force generated when the ferroelectric liquid crystal is pushed;
    display control means for controlling a display state of said ferroelectric liquid crystal;
    sound generation control means for supplying a sound generation signal to said electrodes so that said ferroelectric liquid crystal panel generates a sound in correspondence thereto; and
    selection means for selectively connecting said position detecting means, said display control means and said sound generation control means to said electrodes.

6. A ferroelectric liquid crystal touch panel according to claim 5, wherein said selection means includes means for selectively connecting said position detecting means, said display control means and said sound generation control means to said electrodes in a time sharing manner.

* * * * *